US012238133B1

(12) United States Patent
Matear et al.

(10) Patent No.: US 12,238,133 B1
(45) Date of Patent: Feb. 25, 2025

(54) PREDICTIVE SCAN ENGINE AUTOSCALING

(71) Applicant: Rapid7, Inc., Boston, MA (US)

(72) Inventors: Luke Matear, Belfast (GB); Stephen Hegarty, Belfast (GB)

(73) Assignee: Rapid7, Inc., Boston, MA (US)

( * ) Notice: Subject to any disclaimer, the term of this patent is extended or adjusted under 35 U.S.C. 154(b) by 83 days.

(21) Appl. No.: 17/845,418

(22) Filed: Jun. 21, 2022

(51) Int. Cl.
H04L 9/40 (2022.01)

(52) U.S. Cl.
CPC ........ H04L 63/1433 (2013.01); H04L 63/107 (2013.01); H04L 63/1416 (2013.01)

(58) Field of Classification Search
CPC H04L 63/1433; H04L 63/107; H04L 63/1416
See application file for complete search history.

(56) References Cited

U.S. PATENT DOCUMENTS

| | | | |
|---|---|---|---|
| 8,127,358 B1 | 2/2012 | Lee | |
| 8,578,499 B1 | 11/2013 | Zhu et al. | |
| 10,032,032 B2 | 7/2018 | Suarez et al. | |
| 2012/0216190 A1 | 8/2012 | Sivak | |
| 2017/0180346 A1 | 6/2017 | Suarez et al. | |
| 2019/0258807 A1* | 8/2019 | DiMaggio | G06F 21/577 |
| 2020/0057857 A1* | 2/2020 | Roytman | G06N 20/20 |
| 2022/0215100 A1* | 7/2022 | Waplington | G06F 21/577 |
| 2023/0004858 A1* | 1/2023 | Santhanagopal | G06F 8/20 |
| 2023/0141928 A1* | 5/2023 | Sterba | H04L 63/1416 |
| | | | 726/22 |

* cited by examiner

Primary Examiner — Vu V Tran
(74) Attorney, Agent, or Firm — Ashwin Anand (57) ABSTRACT

Various embodiments include systems and methods to implement predictive scan autoscaling by a security platform to predict scanning loads associated with computing resources. Predictive scan autoscaling may improve the security posture of computing resources by improving the speed by which a security platform may scan for threats of a cyberattack. The security platform may predict scanning loads based on data indicative of previous scanning loads over one or more periods of time. The security platform may combine predicted scanning loads with requests for scans received from various client networks.

17 Claims, 8 Drawing Sheets

Determine, based on a prediction model associated with a computing resource, a first number of compute instances, where the first number of compute instances are usable to perform a security service associated with the computing resource.
510

Deploy, based on the first number of compute instances and prior to receiving a request to initiate the security service, a second number of compute instances, where the second number of compute instances is within a threshold number to the first number of compute instances.
520

Receive the request to perform the security service.
530

Initiate, in response to receiving the request to perform the security service, execution of the security service on the second number of compute instances.
540

Determine, based on a particular client network, a cluster of client networks, where the cluster of client networks is based on one or more similarities among client network asset deployments.
710

Determine, based on the cluster of client networks, a prediction model that indicates a security service load based on a particular time.
720

Determine, based on the prediction model, a first number of compute instances, where the first number of compute instances are usable to perform the security service.
730

Deploy, prior to receiving a request to perform the security service, the first number of compute instances.
740

Initiate, in response to receiving the request to perform the security service, execution of the security service on the first number of compute instances.
750

PREDICTIVE SCAN ENGINE AUTOSCALING

BACKGROUND

Many companies operate computer environments that are connected to public networks such as the internet. While such connections allow users to access resources on public networks, they also expose a company network to cyberattacks. Cyberattacks may obtain sensitive information, gain control of the company's computing systems, or damage company resources. To prevent cyberattacks, security management systems have become increasingly important to protect private company networks against these types of vulnerabilities.

While embodiments are described herein by way of example for several embodiments and illustrative drawings, those skilled in the art will recognize that embodiments are not limited to the embodiments or drawings described. It should be understood that the drawings and detailed description are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to".

DETAILED DESCRIPTION OF EMBODIMENTS

As disclosed, a security platform may improve protection from cyberattacks to one or more computing resources based on predicting a scanning load and using the predicted scanning load to scale scan engines from which a security service is performed. The security platform may scale scan engines prior to receiving requests to perform security services. The security platform may adjust a number of deployed scan engines in response to received requests for security services. The security service may perform security services with respect to the one or more computing resources being protected by the security platform.

In some implementations, the security platform may use a time-series analysis to predict a scanning load based on one or more datasets indicative of previous numbers of deployments of a security service at different points in time. A computing resource may be a website, an application, a network, a device, or some other resource that may be vulnerable to a cyberattack. A scanning load may be a number of requests for security services at a given time or within a given period of time.

In traditional security systems, deployment of a security service may be based entirely in response to a request to perform the security service. However, with respect to systems that use dynamic scaling to deploy compute instances to perform the security service, a disadvantage of such a traditional system is that there may be a delay between a request to perform the security service and execution of the security service. In such traditional systems, the delay may include time to provision, deploy, and configure compute instances to perform the security service.

In certain implementations, the security platform may provision and deploy scan engines prior to receiving a request to perform security services on one or more computing resources. Based on deploying scan engines prior to receiving a request for security services, such as a scan, the security platform may reduce an amount of time between a request for a scan and performance of the scan. In some examples, deployment of a scan engine may take a given amount of time, such as a number of minutes. Based on the security platform predicting a scanning load that is at least the given amount of time in advance of one or more requests for security services, a delay between the requests and performance of the security services may be reduced or eliminated. A scan engine may be a deployment of a security service onto a provisioned compute instance that is configured to perform a security service, such as a scan for cyberattacks. Scan engines may be provisioned from a cloud services provider.

Continuing this example, the security platform may train a prediction model based on snapshot data indicative of one or more metrics associated with a scanning load, such as a number of requests for security services at given points in time. Based on the prediction model, the security platform may determine a predicted number of scan engines to deploy at a given time. Snapshot data may be collected periodically and may indicate scanning loads associated with different periods of time. In some examples, scanning loads may be indicative of a number of security services operating, such as a number of scan engines among other types of security services. As the security platform receives requests for security services, the security platform may generate training data that improves the accuracy of the prediction model.

In certain implementations, the security platform may determine a prediction model based on a time-series analysis using snapshot data. The prediction model may be an auto-regressive integrated moving average (ARIMA) model that may be fitted to time-series data to determine a pattern of scanning loads over time. The prediction model, using a given time as input, may be used to predict upcoming scanning loads, where the scanning loads are associated with requests for security services from one or more client networks. The security platform may deploy a scan engine for each request for a security service, such as a scan request. For example, the security platform may provide a particular date and time to the prediction model to determine a scanning load N minutes from the particular date and time, where N may be a configurable amount of time.

In certain implementations, the security platform may deploy compute instances based on both a prediction of a scanning load and on a scanning load based on requests for security services. For example, predicted scanning loads may be used to deploy a first number of scan engines prior to receiving requests from client networks. The predicted scanning load may be a first scanning load. Continuing this example, the security platform may receive a number of requests for scans. The number of requests may be a second scanning load. Based on the first scanning load and the second scanning load, the security platform may adjust a number of deployed scan engines. The adjustment may an increase or decrease in a number of scan engines.

Based on the security platform using snapshot data to determine a prediction model to predict scanning loads, the security platform may provide security services more quickly than if the security platform were to wait for a request before deploying scan engines to perform the security services. A quicker deployment of security services may identify potential threats sooner and mitigate any consequences of a cyberattack more effectively. Such a quicker deployment of security services may preserve a user's security reputation, save money from cyberattack remediation efforts, reduce legal liabilities, provide more reliable services, and improve the goodwill a user may have with customers.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Figure 1:
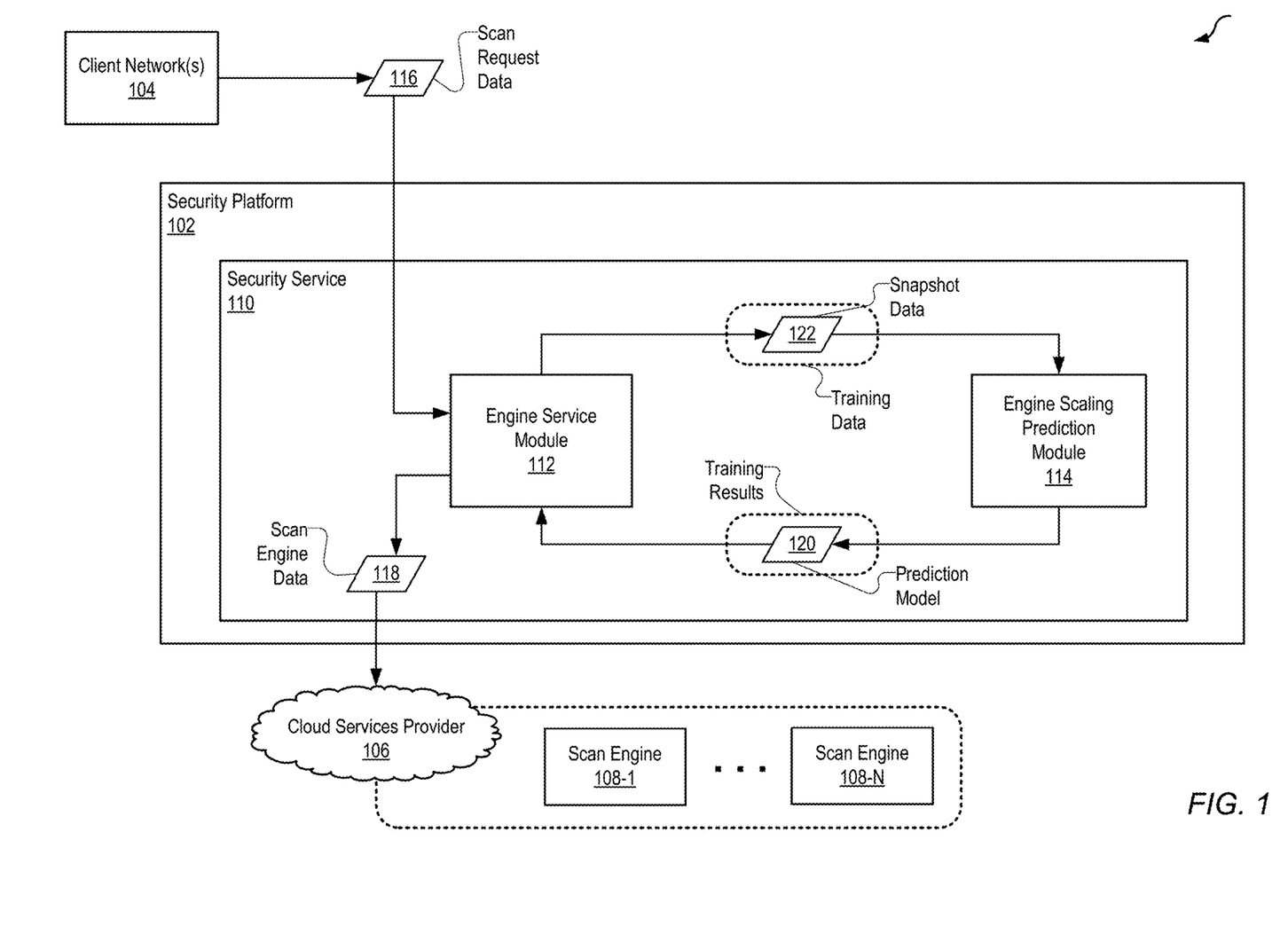
FIG. 1 is a block diagram illustrating an example system that implements a security platform comprising predictive scan engine autoscaling, in accordance with some embodiments.

Referring to FIG. 1, an example computing environment 100 illustrates various components of a security platform 102 that implements predictive scan engine autoscaling, in accordance with some embodiments.

In some implementations, the security platform 102 may provide one or more security services. In this example, the one or more security services may include a scan service. The security platform 102 may deploy scan engines within a cloud computing environment to perform scan services. The security platform 102 may scale scan engines based on predicted scanning loads, on scan requests, or on both predicted scanning loads and scan requests. The security platform 102 may scale scan engines up or down, by increasing or decreasing a number of deployed scan engines.

The security platform 102 may receive requests to scan one or more computing resources. The requests may be received from one or more client networks, such as client network 104. The computing resources may be computing resources associated with the client networks. The security platform 102 may provide security services intended to protect the computing resources from cyberattacks. The computing resources may provide services offered by a client.

The security platform 102 may provision and deploy one or more scan engines to perform scan services. The scan engines may be provisioned and deployed within a cloud computing environment provided by a cloud services provider, such as cloud services provider 106. Any number of scan engines, such as scan engines 108-1-108-N, may be provisioned and deployed by the cloud services provider 106.

Client network 104 may include computing resources used by a client of the security platform 102. The client network 104 may include workstations, servers, personal computers, cloud compute instances, mobile devices, among other types of computing resources. The computing resources provided by a client network 104 may provide a user interface usable to access one or more of the features provided by the security platform 102. The one or more features may include options for requesting security services, such as scan services, from the security platform 102. Client networks 104 are described in greater detail with respect to FIG. 2.

Cloud services provider 106 may be implemented as a system and computing environment that provides services to users of the cloud services provider 106 through the sharing of computing resources. The cloud services provider 106 may provide on-demand access to a shared pool of configurable computing resources such as computer networks, servers, storage, applications, services, and so on. The shared pool of configurable resources may be rapidly provisioned and released to a user of the cloud services provider 106 with minimal management effort. Example cloud services providers include Amazon™ AWS, Microsoft Azure™, Google Cloud Platform™, among others. A given scan engine may be implemented by one or more compute instances provided by the cloud services provider 106.

The security service 110 may implement a scan service provided by the security platform 102. The security service 110 may be implemented as a software and/or hardware module. The security service 110 may comprise an engine service module 112 and an engine scaling prediction module 114.

With respect to the scan service, the security service 110 may provide a user interface usable to create at least one custom check file. The security service 110 may also use default options for scanning for cyberattacks. In some examples, a check file may comprise one or more files in an XML file format that may define a customer-authored vulnerability check for a particular security vulnerability, and a customer may then load any check files into a local security console prior to a scan, for storage within a local filesystem. A user interface presented at the local security console (also referred to herein as a "security console user interface" or simply a "console") may provide site configuration options that allow the customer to identify the customer-authored vulnerability check for use within a scan template and to select a particular scan engine instance associated with a particular scan engine that is to be utilized to perform the scan.

Continuing this example, in response to initiation of the scan, the local security console may access the local filesystem to retrieve the custom check file(s) associated with the identified custom vulnerability check for transfer to a scan engine. In some examples, if custom checks are not disabled for a scan engine, the local security console may initiate transfer of the custom check file(s) associated with the identified custom vulnerability check from the local filesystem to the scan engine. The custom check file(s) received by the scan engine may be moved into the appropriate custom scanner directories of a filesystem accessible by the scan engine. The scan engine may prepare the scan process, which may include locating and retrieving custom check file(s). The custom vulnerability check information may be loaded into the scan engine's vulnerability manager and/or vulnerability check manager components. In this example, a scan process may begin, and the scan engine may use the custom vulnerability check information. In this example, subsequent to completion of a scan, one or more results of the scan may be communicated from the scan engine for presentation to the customer via the local security console.

The engine service module 112 may receive scan requests, deploy scan engines, initiate scans, train prediction model based on snapshot data, and update the prediction model with additional snapshot data. Scan request data 116 may indicate one or more scan requests. Scan engine data 118 may comprise instructions to the cloud services provider 106 that indicate one or more of: provisioning of compute instances, deploying a scan engine onto a compute instance, monitoring of compute instances, or deprovisioning of compute instances. As described herein, deployment of a scan engine may comprise provisioning, configuring, and/or initiating a scan engine on one or more compute instances.

The engine service module 112 may determine a predicted scanning load that may be expected at a particular time in the future. In response to determining the predicted scanning load, the engine service module 112 may deploy a number of scan engines before the particular time. The engine service module 112 may determine the predicted scanning load based on a prediction model using a specified time as input. In some example, the input may be indicative of a time and/or a number of scan requests in a scan request queue. An indicated time may specify a calendar date and/or a time of day. A scan request queue may comprise one or more scan requests received from one or more client networks 104, where scan requests in the scan request queue may be pending and/or in progress.

The engine scaling prediction module 114 may determine a prediction model 120 using various techniques. For example, the engine scaling prediction module 114 may, based on snapshot data 122, use linear regression analysis to determine the prediction model 120. The snapshot data 122 may be used as training data by the engine scaling prediction module 114 and the prediction model 120 may be a training result. In this example, using a linear regression analysis, an independent variable may be time, and a dependent variable may be a number of scan requests in a scan request queue. The number of scan requests in the scan request queue at a given time may be a scanning load.

Continuing this example, the prediction model may comprise an autoregressive integrated moving average (ARIMA) model that is fitted to time series data. The time series data may be based on the snapshot data. Based on the prediction model, the engine service module 112 may determine a scanning load for a given time of a calendar year.

In some implementations, the engine scaling prediction module 114 may determine a prediction model 120 using machine learning techniques. For example, the prediction model 120 may be a trained machine learning model. A machine learning model may be trained using training data comprising the snapshot data 122. The snapshot data 122 may comprise a plurality of associations between points in time throughout a calendar year and scanning loads.

The engine scaling prediction module 114 may determine an updated prediction model periodically, in response to an indication to update the prediction model, or after collecting a threshold number of instances of snapshot data. As a first example, the engine scaling prediction module 114 may determine an updated prediction model after lapse of a specified period of time, where the period of time may be configurable. As a second example, the engine scaling prediction module 114 may determine an updated prediction model in response to a request from the security platform 102. As a third example, the engine scaling prediction module 114 may determine an updated prediction model based on receiving or collecting a number of snapshot data instances, where the number is greater than a threshold number. The threshold number may be configurable.

In some implementations, the engine service module 112 may receive scan request data 116 that indicates initiation of a first number of scans with respect to a computing resource. In this example, for simplicity, each individual scan engine may perform an individual scan of an individual computing resource. However, in other examples, a scan engine may perform multiple scans across multiple computing resources. Based on the first number of scan requests, the engine service module 112 may deploy the first number of scan engines within a cloud computing environment provided by the cloud services provider.

In some implementations, the engine service module 112 may deploy scan engines based on a first number of scan requests in a scan request queue and on a second number of predicted scan requests. For example, the engine service module 112 may deploy a first one or more scan engines based on the second number of predicted scan requests. The first one or more scan engines may be ready before one or more scan requests are received and queued into the scan request queue.

In this example, if the number of scan requests in the scan request queue are less than the one or more scan engines deployed based on the second number of predicted scan requests, then each of the scan requests in the scan request queue may be initiated without waiting for deployment of a corresponding scan engine. Continuing this example, the one or more scan engines deployed based on the second number of predicated scan requests is less than the first number of scan requests in the scan request queue, then the engine service module 112 may deploy an additional number of scan engines. The additional number of scan engines may be a difference between the second number of predicted scan requests and the first number of scan requests.

Figure 2:
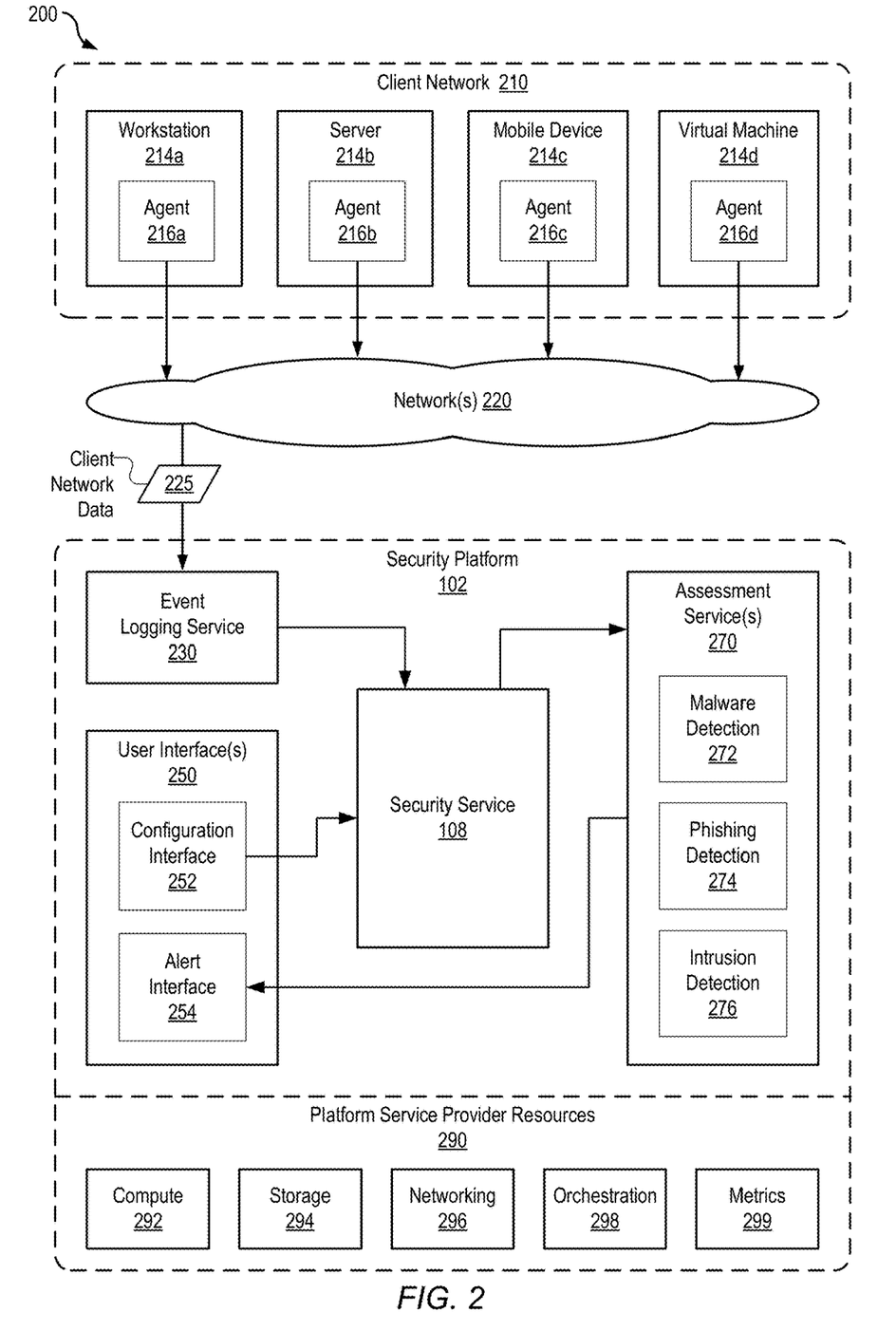
FIG. 2 is a block diagram illustrating example computing resources that implement a security platform, in accordance with some embodiments.

FIG. 2 is a block diagram illustrating the security platform 102 implemented by a platform service provider network, according to some embodiments.

The security platform 102 may comprise one or more services implemented within a cloud computing environment and/or on a platform service provider network, such as a platform-as-a-service (PaaS) network, an infrastructure-as-a-service provider (IaaS) network, or a software-as-a-service (SaaS) network. The security platform 102 may be configured to communicate with agents 516a-d deployed on machines 514a-d in a client network 210. The client network 104 described with respect to FIG. 1 may be implemented by the client network 210.

The agents 216 may communicate with the security platform 102 over one or more intermediary networks 220. In some embodiments, the agents 216 may be configured to collect or compile network activity data or network event data, and transmit the data, depicted as client network data 225, to the security platform 102. The security platform 102 may receive network activity data from many different client networks operated by different entities, companies, organizations, groups, etc., and perform remote monitoring of the networks of these different clients.

As shown, the client network 210 in this example includes different types of computing resources, such as a workstation 214a, a server 214b, a mobile device 214c, and a virtual machine 214d. The virtual machine 214d may be an instance of a computer and operating system that is emulated and hosted on a physical virtual machine host. The virtual machine host may implement virtualization hardware and/or software (e.g., a hypervisor) to execute and manage multiple instances of guest operating systems. Example implementations of such virtualization technologies include VMware ESX/ESXI, Microsoft Hyper-V, Amazon Web Services, and Microsoft Azure. Another type of virtualized execution environment may be a hosted container, which provides a portable and isolated execution environment over a host operating system of a physical host. Examples of container hosting technologies include Docker, Google Kubernetes, Amazon Web Services, and Microsoft Azure. In some embodiments, the virtual machine 214d may be hosted in a platform service provider network, such as the platform service provider network that is hosting the security platform 102. In some embodiments, the agents 216 may be deployed on other types of computing systems, including embedded systems, networking devices, storage devices, Internet-of-Things (IoT) devices, vehicles, and the like.

In various embodiments, the network 220 may encompass any suitable combination of networking hardware and protocols necessary to enable communications between the agents 216 and the security platform 102. In some embodiments, the remote machines 214 may execute in a private network of a company, behind a company firewall, and the network 220 may include a public network such as the Internet, which lies outside the firewall. The network 220 may encompass the different telecommunications networks and service providers that collectively implement the Internet.

In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, routing software, firewall/security software, etc.) for establishing networking links between the remote machines 214 and the security platform 102. In some embodiments, the agents 216 may transmit the client network data 225 to the security platform 102 over secure communication channels such as transport layer security (TLS) connections implemented over the network 220.

As shown in this example, the security platform 102 is implemented using a number of supporting services 230, 108, 250, and 270 implemented by the platform service provider network. Clients of the security platform 102 may convey service requests to and receive responses from these services via their respective service interfaces. In some embodiments, the service request and responses may be defined as part of a RESTful API (e.g., one or more web services). The requests and responses may be formatted as JSON documents. In some embodiments, the security platform 102 may implement service interfaces using other types of remote procedure calling protocols, such as Google Protocol Buffers. The platform service provider network may provide the hardware and/or software needed to implement service endpoints for these services, and the request routing facilities to ensure that a request is properly routed to the appropriate endpoints.

As shown, the platform service provider network may provide different types of computing resources, such as platform service provider resources 290, which can be used by customers to implement hosted services. As shown, the platform service provider may provide resource services such as compute resource service 292, storage resource service 294, networking resources service 296, orchestration service 298, and resource metrics service 299. The services of the security platform 102 may be built using these underlying resource services provided by the platform service provider.

In some embodiments, the platform service provider resources 290 may implement features such as load balancing of service requests and/or dynamic management and scaling of service node pools. In some embodiments, each of the services 230, 108, 250, and 270 may be implemented using a pool of service nodes provided by the platform service provider, which may be individual instances of virtual machines. In some embodiments, the platform service provider may be a provider such as Amazon Web Services or Microsoft Azure.

In some embodiments, the security platform 102 may be configured to monitor, analyze, and respond to security-related incidents that are detected in the remote client networks 210. In some embodiments, the security platform 102 may implement an event logging service 230 that receives client network data 225 from a client network 210 and stores the received data. The event logging service 230 may implement service functionality to allow users or other software components to query the event logs.

As shown, in some embodiments, the assessment service (s) 270 may implement a variety of monitoring processes to generate alerts in response to detected security problems in the client network 210. These alerts may be forwarded to an alert interface 254, which may allow human security analysts to perform a more in-depth examination of any underlying security problems. For example, in some embodiments, a malware detection module 272 may examine collected machine event logs to detect installation of a particular type of malware executable. As another example, a phishing detection module 274 may examine the email event logs to detect phishing attacks using new or unusual email addresses, web addresses, or email content. As yet another example, an intrusion detection module 276 may examine the network event logs to detect suspicious communication patterns or attacker packet signatures. In some embodiments, the alerts generated by the assessment service (s) 270 may trigger automated mitigation actions to be performed on the client network 210 to address detected threats in the client network.

In some embodiments, the security platform 102 may implement one or more user interface(s) 250, which may be implemented as GUIs or web interfaces viewable using a web browser. In some embodiments, these user interfaces 250 may be implemented by client-side applications. As shown, the user interfaces may include the alert interface 254 to notify users of detected alerts. In some embodiments, the alert interface 254 may be accessible from both the client network 210 and a central monitoring location where security analysts are monitoring the client network.

In some embodiments, the user interface(s) 250 may also implement a configuration interface 252. The configuration interface 252 may be used to configure various aspects of the security platform 102, including the security service 108. For example, the configuration interface 252 may be used to control various aspects of how the security service 108 operates, including initiating a scan, indicating one or more computing resources, and/or specifying a scanning schedule.

In some implementations, the security platform 102 may be implemented within a container system of a cloud computing environment or a container system of a data center. For example, a container system may be implemented by one or more container orchestration systems, including Kubernetes™, Docker Swarm™, among others. The container orchestration system may run on a cluster of nodes. In some examples, a given node may comprise a container runtime, where the given node may be implemented by one or more compute instances provided by a cloud services provider. In some examples, a given node among the cluster of nodes may comprise a container runtime, compute resources, memory, and one or more container instances.

In some implementations, the security platform 102 may comprise multiple services. For example, the security platform 102 may comprise services implemented by containerized applications operating on one or more nodes of a cluster. In this example, the security platform 102 may be implemented by a one or more containerized applications.

Figure 3:
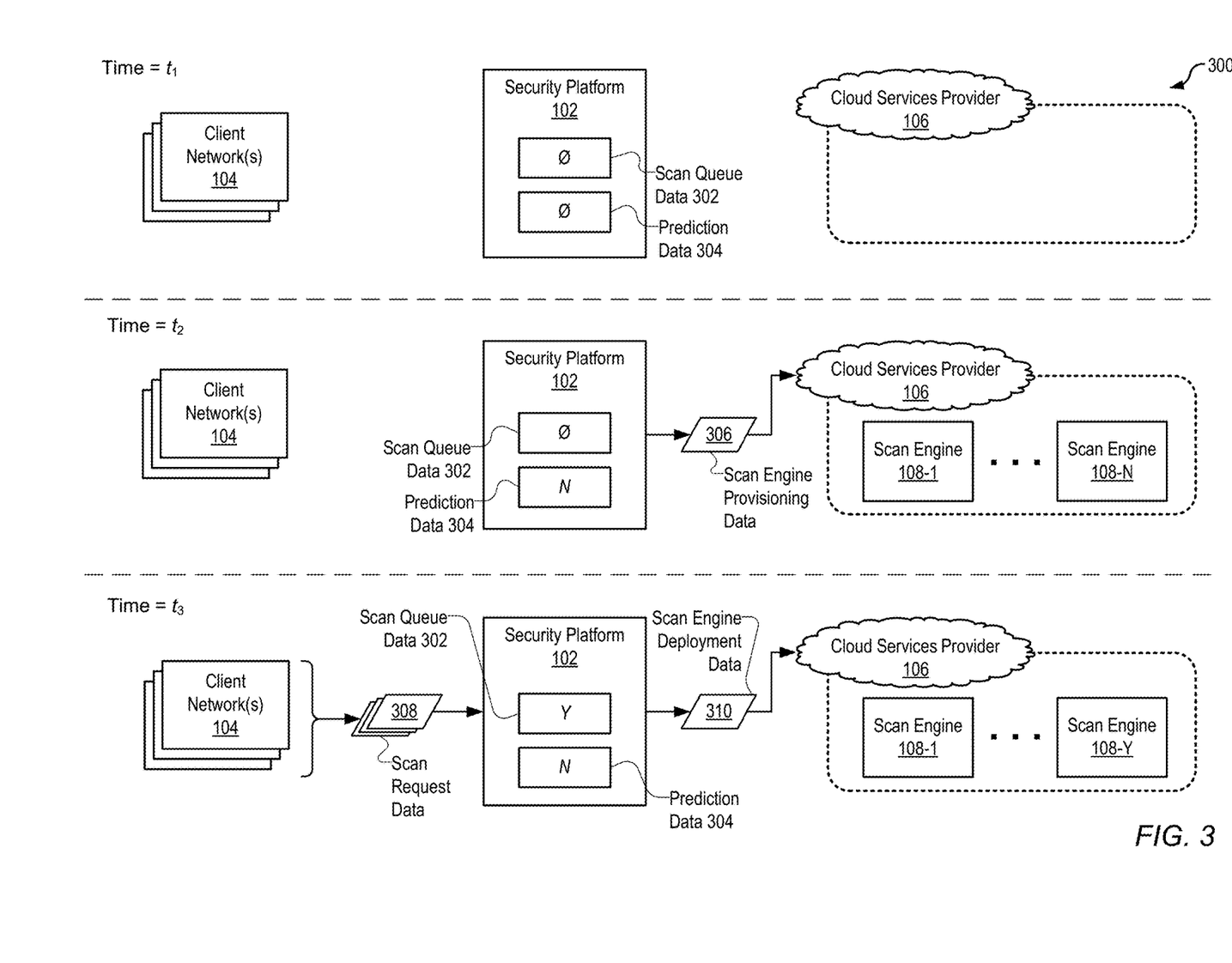
FIG. 3 is a block diagram illustrating an example computing environment that implements a security platform comprising predictive scan engine autoscaling, in accordance with some embodiments.

FIG. 3 is a block diagram 300 illustrating the security platform 102 implementing predictive scan autoscaling, according to some embodiments.

As depicted, the security platform 102 is depicted at various times to illustrate deploying scan engines for a scan prior to receiving a request for scans from one or more client networks 104. Based on deploying scan engines prior to a request for scan services, the security platform 102 may reduce an amount of time between a request for scan services and initiation of scan services.

In this example, at a first time=$t_1$, the security platform 102 has an empty scan queue, as depicted by scan queue data 302. An empty scan queue may be indicative of the security platform 302 not having any pending scan requests. At the first time, the security platform 102 may not yet determined a predicted scanning load, and consequently, the prediction data 304 is zero or undefined. At the first time, based on the scan queue data 302 indicating an empty scan queue and on the prediction data 304 indicating no predicted scanning load (or no scanning load), the security platform 102 has not provisioned or deployed any scan engines from the cloud services provider 106. As a result, at the first time, there are no deployed scan engines.

At a second time, time=$t_2$, the security platform 102 has determined a predicted scanning load. The scanning load is indicative of N scan requests. In this example, the input to a prediction model may be specified to be X minutes from a current time, time=$t_2$. Consequently, at the second time, a scanning load of N scan requests is predicted to be received within X minutes from a current time. In this example, X may be based on an amount of time to deploy N scan engines. In this example, if it takes 5 minutes for the cloud services provider 106 to deploy N scan engines, then X may be specified to be 5 minutes. Continuing this example, at the second time, and based on the predicted scanning load being equal to N scan requests, the security platform 102 may provide scan engine provisioning data 306 to the cloud services provider 106 to provision N scan engines.

At the third time, time=$t_3$, the security platform 102 has received Y scan requests from the one or more client networks 104. The Y pending scan requests may be indicated by the scan queue data 302. In this example, depending on an accuracy of the predicted scanning load N, the security platform may have exactly enough scan engines, may scale up scan engines, or scale down scan engines. For example, if Y=N, then there may be enough scan engines ready (or nearly ready if there were delays in provisioning) to perform the pending scan request. Continuing the case where Y=N, the security platform may deploy N scan engines without or with a reduced delay associated with provisioning the scan engines 108. In this example, if Y>N, then there may be an insufficient amount of scan engines. Continuing the case where Y>N, the security platform may deploy N scan engines without or with reduced delay associated with provisioning the scan engines 108 and the security platform 102 may provision and deploy (Y−N) additional scan engines to scale up to Y scan engines. In this example, if Y<N, then the security platform 102 may have an excess of scan engines. Continuing the case where Y<N, the security platform may deploy Y scan engines and scale down the number of scan engines by (N−Y).

In this example, based on the security platform 102 using a predicted scanning load to deploy scan engines prior to receiving requests for scan services, the security platform may reduce or eliminate delays associated with deploying scan engines in response to scan requests.

Figure 4:
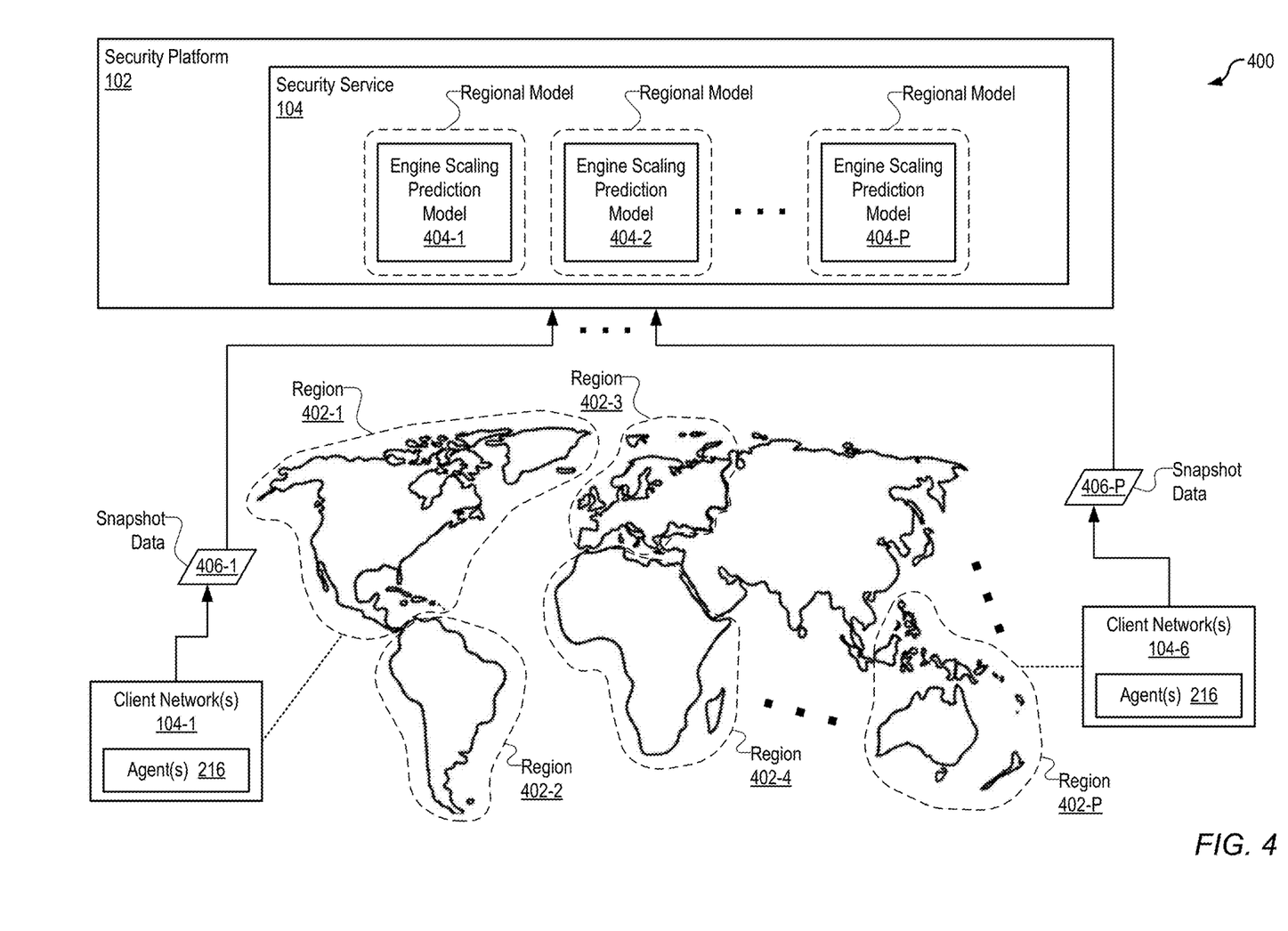
FIG. 4 is a block diagram illustrating an example computing environment that implements a security platform comprising predictive scan engine autoscaling, in accordance with some embodiments, in accordance with some embodiments.

FIG. 4 is a diagram 400 illustrating the security platform 102 implementing predictive scan autoscaling, according to some embodiments.

As depicted, the security platform 102 may use a prediction model associated with a geographic region to deploy scan engines for one or more client networks 104. In this example, a regional prediction model may be based on a geographic region in which computing resources for a client network 104 are physically located.

In this example, based on using a regional prediction model, the security platform 102 may determine more accurate scanning load predictions. For example, scanning loads may depend on regional regulations that are associated with when a security service is performed. As one example, the European Union may have specified one or more calendar dates by which an entity, such as a business or client, may have to comply with a given security regulation or policy. As a result, in a period of time prior to a security or privacy compliance date, there may be an increase in scanning loads from client networks in the geographic region that comprises the European Union. Similar regional prediction models may be determined for other geographic regions that may have associated regional regulations or regional patterns.

In other examples, different geographic regions may have different patterns for scanning loads at various times. For example, the security platform 102 may determine different regional prediction models 404-1-404-P associated with respective geographic regions 402-1-402-P. In this example, there may be P geographic regions, regions 402-1-402-P.

In some implementations, for a given geographic region 402-X within the geographic region 402-1-402-P, one or more client networks 104-X within the geographic region 402-X may provide associated snapshot data 406-X. The snapshot data may be collected and provided by an agent 216. For each geographic region 402, the security platform 102 may determine a regional prediction model 404 based on snapshot data 406 from client networks 104 within a given geographic region. For a given geographic region 402, a region prediction model 404 may be trained on snapshot data 406 similar to training a prediction model as described with respect to FIG. 1.

Continuing this example, the security platform 102 may determine a scanning load by determining a region associated with a client network 104. Based on the determined region, the security platform 102 may determine a regional prediction model 404. The security platform 102 may determine a predicted scanning load based on the regional prediction model 404 similar to the security platform 102 using the prediction model 120, as described with respect to FIGS. 1 and 2.

Figure 5:
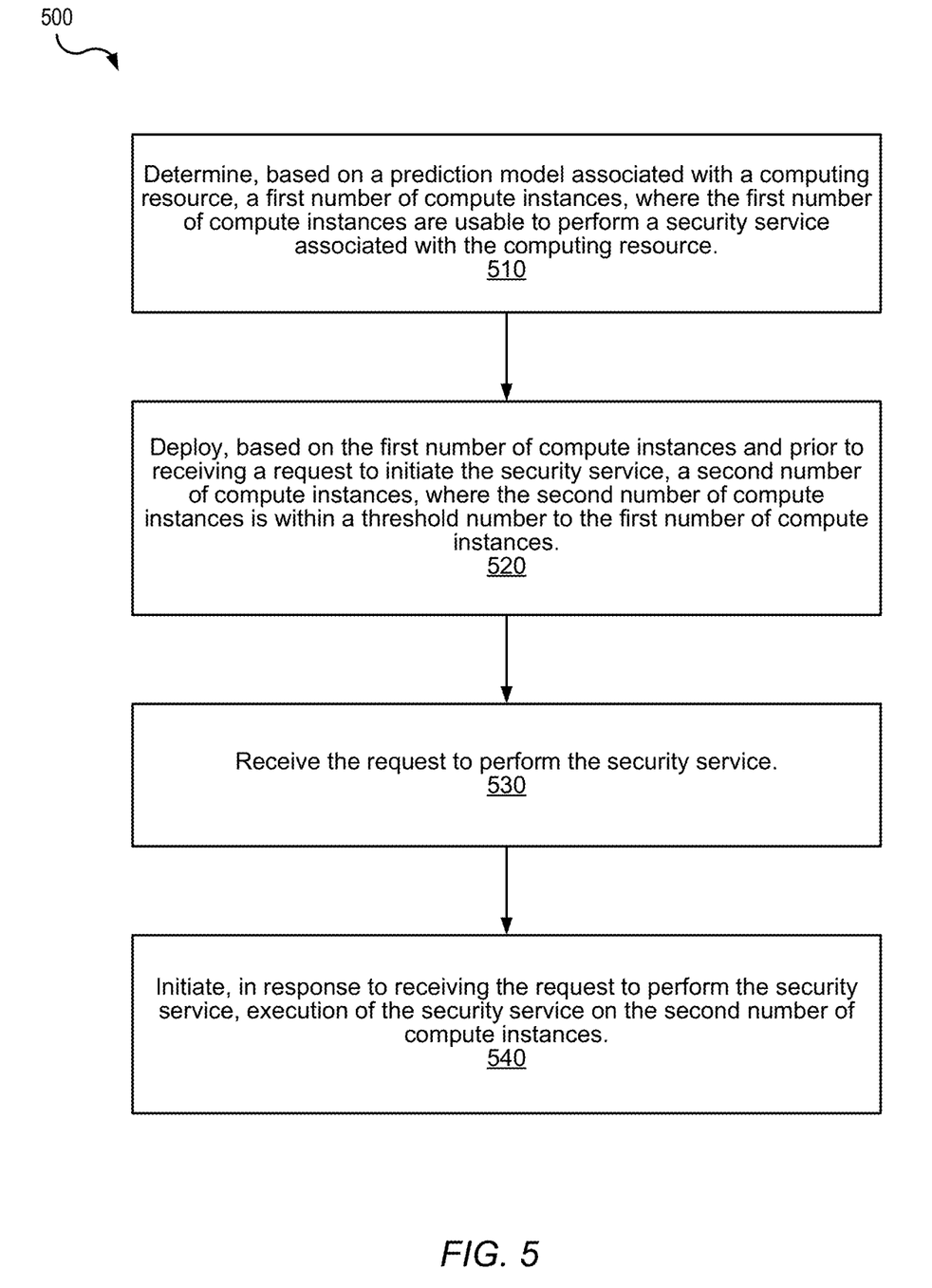
FIG. 5 is a flowchart that illustrates an example process of implementing a security platform comprising predictive scan engine autoscaling, according to some embodiments.

FIG. 5 is a flowchart 500 that illustrates an example of the security platform 102 implementing predictive scan autoscaling, according to some embodiments. In FIG. 5, one or more hardware processors may be used to implement the example process.

The example process includes: determining, at 510, based on a prediction model associated with a computing resource, a first number of compute instances, where the first number of compute instances are usable to perform a security service associated with the computing resource; deploying, at 520, based on the first number of compute instances and prior to receiving a request to initiate the security service, a second number of compute instances, where the second number of compute instances is within a threshold number to the first number of compute instances; receiving, at 530, the request to perform the security service; and initiating, at 540, in response to the receiving the request to perform the security service, execution of the security service on the second number of compute instances.

Determining, at 510, based on the prediction model associated with a computing resource, the first number of compute instances may be carried out as described with respect to FIG. 1. For example, the security platform 102 may use the prediction model with respect to a particular time in the future, where the particular time may be based on an amount of time to deploy one or more scan engines. In this example, there may be a single prediction model that is associated with computing resources for one or more client networks, such as client networks 104. As described with respect to FIG. 1, given the particular time, the prediction model may output a scanning load, where the scanning load is associated with a number of scan requests. In this example, the first number of compute instances may be based on the number of scan requests, where a given compute instance may be configured to execute a given scan engine associated with a given scan request.

Determining, at 520, based on the first number of compute instances and prior to receiving a request to initiate the security service, a second number of compute instances, where the second number of compute instances is within a threshold number to the first number of compute instances may be carried out in different ways. In some examples, the second number of compute instances may be equal to the first number of compute instances. In other examples, the threshold number may be based on a number of compute instances that may result in similar performance as the first number of compute instances. In other examples, the threshold number may be based on a first amount of computing resources associated with the first number of compute instances being substantially similar to a second amount of computing resources associated with the second number of compute instances.

Determining, at 530, the request to perform the security service may be carried out as described with respect to FIG. 1. As described with respect to FIG. 1, the security platform 102 may receive scan request data 116 that is indicative of one or more security services.

Initiating, at 540, in response to receiving the request to perform the security service, execution of the security service on the second number of compute instances may be carried out as described with respect to FIG. 1. For example, the security platform may deploy a second number of scan engines on the second number of compute instances, where the scan engines are configured to execute the security service.

Thus, FIG. 5 illustrates an example of a process of using the security platform 102 deploying a security service based on a predictive scanning load prior to receiving a request for performing the security service.

Figure 6:
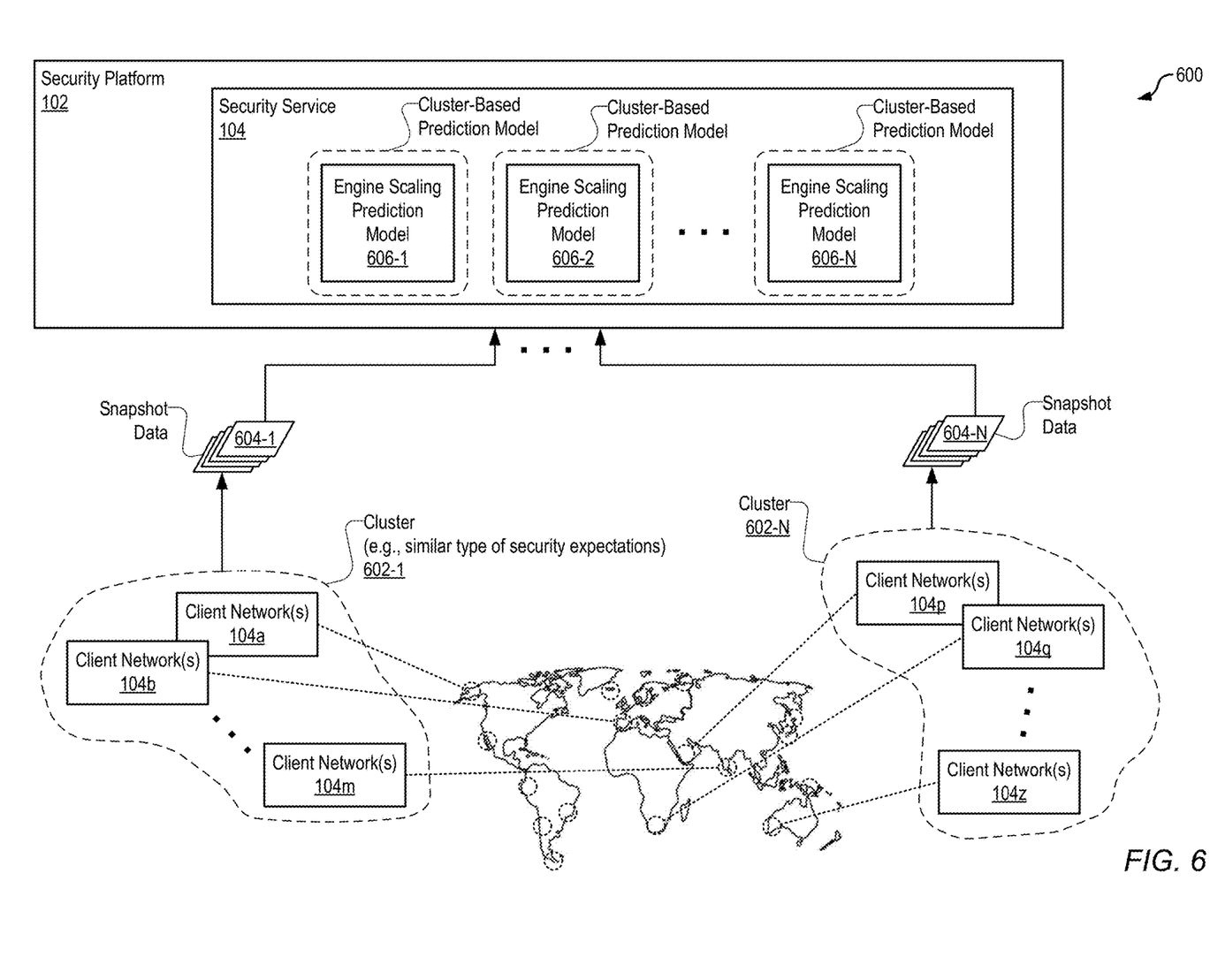
FIG. 6 is a block diagram illustrating an example computing environment that implements a security platform comprising predictive scan engine autoscaling using cluster-based prediction models, in accordance with some embodiments, in accordance with some embodiments.

FIG. 6 is a diagram 600 illustrating the security platform 102 implementing predictive scan autoscaling using cluster-based prediction models, according to some embodiments.

As depicted, the security platform 102 may use a prediction model associated with a given cluster of client networks to deploy scan engines for one or more client networks 104 included within the given cluster of client networks. In this example, a prediction model may be based on similarity of asset deployments within client networks.

In this example, a prediction of a scanning load may be accurate based on similar types of deployments within client networks sharing similar security expectations. For example, enterprise level clients may share similar frequencies and/or patterns of scanning loads as compared to small businesses or individuals. In some examples, enterprise level clients may have higher scanning loads with greater regularity than smaller scale clients. Similarly, enterprise level clients may have similarly scaled quantities of assets deployed within respective client networks.

In some implementations, a first client network may be considered similar a second client network based on similarities between respective asset deployments. Deployment data may be used to describe an asset deployment, including a quantity and/or configuration of deployed assets. Deployment data may describe assets, security components, usage of one or more security components, asset configurations, licensing data for the one or more security components and/or assets, network configurations, configurations of security components, configurations of assets, and so forth. An asset may include one or more compute instances, such as hardware processors, virtual machines, clusters, network devices, communications networks, storage, among other types of computing resources.

Figure 7:
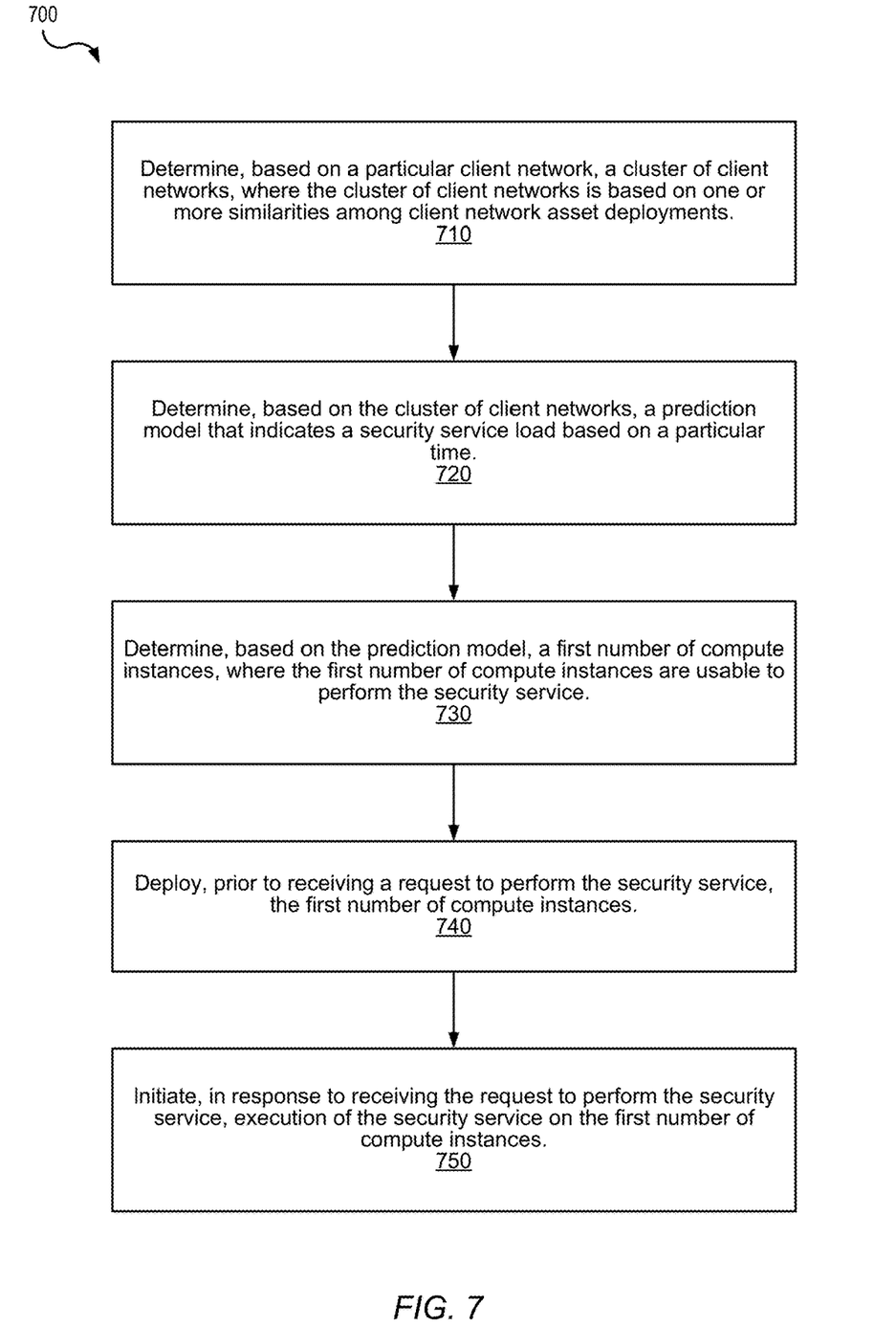
FIG. 7 is a flowchart that illustrates an example process of implementing a security platform comprising predictive scan engine autoscaling using cluster-based prediction models, according to some embodiments.

With reference to FIG. 6, a plurality of client networks 104a-104z may be deployed across different geographic regions, similar to the deployment described with respect to FIG. 4. However, in contrast to the example described with respect to FIG. 4, the plurality of client networks 104a-104z depicted in FIG. 7 are grouped into a plurality of clusters.

In this example, the plurality of clusters includes clusters 602-1-602-N. As depicted, cluster 602-1 includes client networks 104a-104M and cluster 602-N includes client networks 104p-104z. Clustering of client networks 104 is described in greater detail below.

Continuing this example, one or more of the client networks within a given cluster may provide snapshot data 604 to the security platform 102. The security platform 102 may use the snapshot data 604 from the client networks 104 in the given cluster to determine a prediction model associated with the client networks in the given cluster. As depicted, client networks $104a$-$104_m$ within cluster 602-1 provide snapshot data 604-1 to the security platform 102, and client networks 104p-104z within cluster 602-N provide snapshot data 604-N to the security platform 102.

The security platform 102, based on snapshot data 604-X associated with a given cluster 602-X, may determine an engine scaling prediction model 606-X associated with the cluster 602-X, where X may indicate a cluster X within clusters 602-1-602-N. In this example, a given engine scaling prediction model 606 may comprise a cluster-based prediction model. In this example, determining an engine scaling prediction model 606-X based on snapshot data 604-X may be carried out similarly to the described determining an engine scaling prediction model 404 using snapshot data 406 described with respect to FIG. 4. Similarly, the security platform 102 may update a prediction model after initiating execution of the security services, and in response to receiving additional snapshot data.

In some implementations, both regional data and deployment data may be used to determine a prediction model that indicates scanning loads given a particular time. For example, client networks may be first categorized by geographic region, where a first plurality of client networks may be associated with a first region, and second plurality of client networks may be associated with a second region, and so on.

In this example implementation, the first plurality of client networks may be divided into clusters based on similarities of deployment data. Similarities between client network deployment data is described herein. In this way, for each region, there may be multiple prediction models. Determining clusters of client networks may be implemented using one or more clustering algorithms. In some embodiments, a clustering model may be determined using a machine learning model that given a plurality of deployment data, determines one or more clusters of deployment data. In this example, based on the clustering by the machine learning model, each instance of deployment data may be similar to each other instance of deployment data within a same cluster of client networks.

In some implementations, a machine learning model may be trained using datasets that include training data indicating similar deployment data instances. In this example, similarity within training data indicating similar deployment instances may be based on first deployment data being greater than a threshold level of similarity to second deployment data. A threshold level of similarity may be based on one or more values of the first deployment data being within a threshold difference value to one or more values of the second deployment data Continuing this example, the security platform 102 may, at a given time, for a given geographic region, determine multiple scanning load predictions. The multiple scanning load predictions may be a combination of scanning load predictions for one or more clusters of client networks within the given geographic region. The security platform 102 may, given a scanning load prediction that is based on the combined scanning load predictions of the one or more clusters of client networks within a given geographic region, may continue with a process similar to those described above with respect to FIGS. 1-5.

FIG. 7 is a flowchart 700 that illustrates an example of the security platform 102 implementing predictive scan autoscaling using cluster-based prediction models, according to some embodiments. In FIG. 7, one or more hardware processors may be used to implement the example process.

The example process includes: determining, at 710, based on a particular client network, a cluster of client networks, where the cluster of client networks is based on one or more similarities among client network asset deployments; determining, at 720, based on the cluster of client networks, a prediction model that indicates a security service load based on a particular time; determining, at 730, based on the prediction model, a first number of compute instances, where the first number of compute instances are usable to perform the security service; deploying, at 740, prior to receiving a request to perform the security service, the first number of compute instances; and initiating, at 750, in response to receiving the request to perform the security service, execution of the security service on the first number of compute instances.

Determining, at 710, based on the particular client network, the cluster of client networks may be carried out as described with respect to FIG. 6. As described herein, the cluster of client networks may be based on one or more similarities among client network asset deployments. In this example, a cluster of client networks may be determined similarly to determining cluster 602-1.

Determining, at 720, based on the cluster of client networks, a prediction model that indicates a security service load based on a particular time may be carried out as described with respect to FIGS. 1, 4, and 6. For example, as described with respect to FIGS. 1 and 4, the engine scaling prediction module 114 may, based on snapshot data, use linear regression analysis to determine the prediction model. In this example, the snapshot data may be snapshot data 604-1 associated with the cluster of client networks 602-1. In this example, a security service load may be a scanning load.

Determining, at 730, based on the prediction model, a first number of compute instances may be carried out similarly to determining, at 520, based on a prediction model associated with a computing resource, a first number of compute instances, as described with respect to FIG. 5.

Deploying, at 740, prior to receiving a request to perform the security service, the first number of compute instances may be carried out similarly to deploying, at 520, compute instances described with respect to FIG. 5. In some examples, in response to receiving the request to perform the security service, the security platform 102 may scale up or scale down the first number of compute instances. For example, if, based on the request, the security platform 102 determines a second number of compute instances, and the second number is greater than the first number, then the security platform 102 may scale up from the first number of compute instances to the second number of compute instances. Similarly, if, based on the request, the security platform 102 determines a second number of compute instances, and the second number is less than the first number, then the security platform 102 may scale down from the first number of compute instances to the second number of compute instances.

Initiating, at 750, in response to receiving the request to perform the security service, execution of the security service on the first number of compute instances may be carried out similarly to initiating, at 540, execution of security services described with respect to FIG. 5.

Thus, FIG. 7 illustrates an example of a process of using the security platform 102 deploying a security service based on a predictive scanning load prior to receiving a request for performing the security service.

Figure 8:
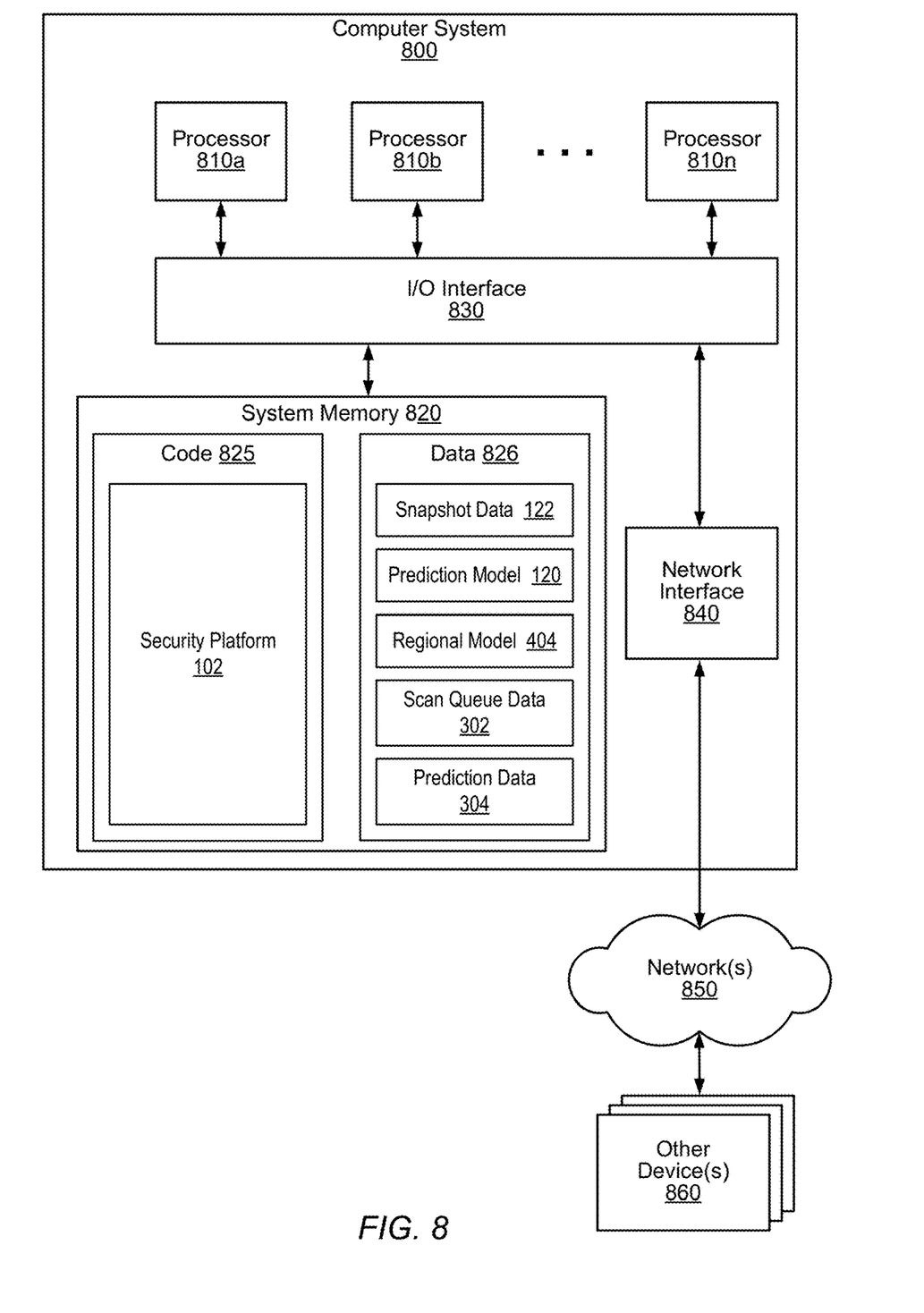
FIG. 8 is a block diagram illustrating an example computer system that may be used to implement one or more portions of a system that implements predictive scan engine autoscaling, according to some embodiments.

FIG. 8 is a block diagram illustrating an example computer system 800 that is used to implement one or more portions of a system that implements a security posture recommender system, according to some embodiments. For example, the computer system 800 may be a server that implements one or more components of the security platform 102 of FIGS. 1 and 2.

Computer system 800 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 800 includes one or more processors 810, which may include multiple cores coupled to a system memory 820 via an input/output (I/O) interface 830. Computer system 800 further includes a network interface 840 coupled to I/O interface 830. In some embodiments, computer system 800 may be a uniprocessor system including one processor 810, or a multiprocessor system including several processors 810a-n, as shown. The processors 810 may be any suitable processors capable of executing instructions. For example, in various embodiments, processors 810 may implement one of a number of instruction set architectures (ISAs), such as the x86, PowerPC, SPARC, or MIPS ISA.

As shown, the computer system 800 may also include one or more network communication devices (e.g., network interface 840) for communicating with other systems and/or components over a communications network. For example, an instance of an application executing on computer system 800 may use network interface 840 to communicate with another server application executing on another computer system, as described herein.

As shown, computer system 800 may use its network interface 840 to communicate with one or more other devices 860, such as persistent storage devices and/or one or more I/O devices. In some embodiments, some of these other devices may be implemented locally on the computer system 800, accessible via the I/O interface 830. In various embodiments, persistent storage devices may include disk drives, tape drives, solid state memory, other mass storage devices, or any other persistent storage device. The computer system 800 may store instructions and/or data in persistent storage devices and retrieve the stored instruction and/or data as needed.

As shown, the computer system 800 may include one or more system memories 820 that store instructions and data accessible by processor(s) 810. In various embodiments, system memories 820 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 820 may be used to store code 825 or executable instructions to implement the methods and techniques described herein. For example, the executable instructions may include instructions to implement the network scanner 120 (including its associated sub-components: the network latency component 121; the dynamic RTT timeout value 122; the RTT parameters 123; and the statistics components 128), as discussed. The system memory 820 may also be used to store data 826 needed or produced by the executable instructions. For example, the in-memory data 826 may include snapshot data 122, prediction model 120, regional model 404, scan queue data 302, and prediction data 304, as discussed.

In some embodiments, some of the code 825 or executable instructions may be persistently stored on the computer system 800 and may have been loaded from external storage media. The persistent storage of the computer system 800 and the external media are examples of non-transitory computer-readable storage media, which may be used to store program instructions to be executed by the computer system 800. A non-transitory computer-readable storage medium may provide the capability to store information in a form readable by a machine (e.g., computer system 800). Non-transitory computer-readable media may include storage media such as magnetic or optical media, disk or DVD/CD-ROM devices, archival tapes, network-attached storage systems, or other computer systems.

In some embodiments, the I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

In some embodiments, the network interface 840 may allow data to be exchanged between computer system 800 and other devices attached to a network. The network interface 840 may also allow communication between computer system 800 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 800 or may be distributed on various nodes of a distributed system that includes computer system 800. In some embodiments, similar input/output devices may be separate from computer system 800 and may interact with one or more nodes of a distributed system that includes computer system 800 through a wired or wireless connection, such as over network interface 840. Network interface 840 may commonly support one or more wireless networking protocols (e.g., Wi-Fi/IEEE 802.11, or another wireless networking standard). In some embodiments, the network interface 840 may support communication via telecommunications/telephony networks such as analog voice networks or digital fiber communications networks, via storage area networks such as Fibre Channel SANs, or via any other suitable type of network and/or protocol.

Advantages and features of the present disclosure may be further described by the following 20 statements.

1. A method comprising: determining, based on a prediction model associated with a computing resource, a first number of compute instances, wherein the first number of compute instances are usable to perform a security service associated with the computing resource; deploying, based on the first number of compute instances and prior to receiving a request to initiate the security service, a second number of compute instances, wherein the second number of compute instances is within a threshold number to the first number of compute instances; receiving the request to perform the security service; and initiating, in response to receiving the request to perform the security service, execution of the security service on the second number of compute instances.

2. The method of any of the preceding statements, further comprising: determining, based on the request to perform the security service, a third number of compute instances; deploying, in response to the receiving the request to perform the security service, the third number of compute instances; and initiating, in response to the receiving the request to perform the security service, the security service on the third number of compute instances.

3. The method of any of the preceding statements, further comprising: determining a particular geographic region associated with the computing instance, wherein the particular geographic region is among a plurality of geographic regions; and determining, based on the particular geographic region, a regional model; wherein the prediction model comprises the regional model.

4. The method of any of the preceding statements, further comprising: receiving, prior to the determining the first number of compute instances, snapshot data; and training, based on the snapshot data, the prediction model.

5. The method of any of the preceding statements, further comprising: receiving, after the initiating the execution of the security service, additional snapshot data; and training, based on the additional snapshot data, an updated prediction model; wherein the prediction model comprises the updated prediction model.

6. The method of any of the preceding statements, wherein the security service is a scan for cyberattacks on the computing resource.

7. The method of any of the preceding statements, wherein a given compute instance among the compute instances comprises a scan engine configured to perform the scan for cyberattacks, and wherein the scan engine is deployed within a cloud computing environment.

8. The method of any of the preceding statements, wherein the threshold number is based on a first amount of computing resources associated with the first number of compute instances being substantially similar to a second amount of computing resources associated with the second number of compute instances.

9. A system comprising: a memory storing executable instructions; and one or more processors that execute the executable instructions to: determine, based on a prediction model associated with a computing resource, a first number of compute instances, wherein the first number of compute instances are usable to perform a security service associated with the computing resource; deploy, based on the first number of compute instances and prior to receiving a request to initiate the security service, a second number of compute instances, wherein the second number of compute instances is within a threshold number to the first number of compute instances; receive the request to perform the security service; and initiate, in response to receiving the request to perform the security service, execution of the security service on the second number of compute instances.

10. The system of any of the preceding statements, wherein the one or more processors further execute the executable instructions to: determine, based on the request to perform the security service, a third number of compute instances; deploy, in response to the receiving the request to perform the security service, the third number of compute instances; and initiate, in response to the receiving the request to perform the security service, the security service on the third number of compute instances.

11. The system of any of the preceding statements, wherein the one or more processors further execute the executable instructions to: determine a particular geographic region associated with the computing instance, wherein the particular geographic region is among a plurality of geographic regions; and determine, based on the particular geographic region, a regional model; wherein the prediction model comprises the regional model.

12. The system of any of the preceding statements, wherein the one or more processors further execute the executable instructions to: receive, prior to the determining the first number of compute instances, snapshot data; and train, based on the snapshot data, the prediction model.

13. The system of any of the preceding statements, wherein the one or more processors further execute the executable instructions to: receive, after the initiating the execution of the security service, additional snapshot data; and train, based on the additional snapshot data, an updated prediction model; wherein the prediction model comprises the updated prediction model.

14. The system of any of the preceding statements, wherein the security service is a scan for cyberattacks on the computing resource.

15. The system of any of the preceding statements, wherein a given compute instance among the compute instances comprises a scan engine configured to perform the scan for cyberattacks, and wherein the scan engine is deployed within a cloud computing environment.

16. The system of any of the preceding statements, wherein the threshold number is based on a first amount of computing resources associated with the first number of compute instances being substantially similar to a second amount of computing resources associated with the second number of compute instances.

17. One or more non-transitory computer-accessible storage media storing executable instructions that, when executed by one or more processors, cause a computer system to: determine, based on a prediction model associated with a computing resource, a first number of compute instances, wherein the first number of compute instances are usable to perform a security service associated with the computing resource; deploy, based on the first number of compute instances and prior to receiving a request to initiate the security service, a second number of compute instances, wherein the second number of compute instances is within a threshold number to the first number of compute instances; receive the request to perform the security service; and initiate, in response to receiving the request to perform the security service, execution of the security service on the second number of compute instances.

18. The non-transitory computer-accessible storage media of any of the preceding statements, wherein the one or more processors further execute the executable instructions to: determine, based on the request to perform the security service, a third number of compute instances; deploy, in response to the receiving the request to perform the security service, the third number of compute instances; and initiate, in response to the receiving the request to perform the security service, the security service on the third number of compute instances.

19. The non-transitory computer-accessible storage media of any of the preceding statements, wherein the one or more processors further execute the executable instructions to: determine a particular geographic region associated with the computing instance, wherein the particular geographic region is among a plurality of geographic regions; and determine, based on the particular geographic region, a regional model; wherein the prediction model comprises the regional model.

20. The non-transitory computer-accessible storage media of any of the preceding statements, wherein the one or more processors further execute the executable instructions to:

receive, prior to the determining the first number of compute instances, snapshot data; and train, based on the snapshot data, the prediction model.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A method comprising:
    determining, based on a prediction model associated with a computing resource, a prediction of a request load of a security service, wherein the prediction is used to determine a first number of compute instances usable to perform the security service associated with the computing resource;
    deploying, based on the first number of compute instances and prior to receiving a request to initiate the security service, a second number of compute instances, wherein the second number of compute instances is within a threshold number to the first number of compute instances;
    receiving the request to perform the security service; and
    initiating, in response to receiving the request to perform the security service, execution of the security service on the second number of compute instances;
    receiving, prior to the determining the first number of compute instances, snapshot data; and
    training, based on the snapshot data, the prediction model.

2. The method of claim 1, further comprising:
    determining, based on the request to perform the security service, a third number of compute instances;
    deploying, in response to the receiving the request to perform the security service, the third number of compute instances; and
    initiating, in response to the receiving the request to perform the security service, the security service on the third number of compute instances.

3. The method of claim 1, further comprising:
    determining a particular geographic region associated with the computing instance, wherein the particular geographic region is among a plurality of geographic regions; and
    determining, based on the particular geographic region, a regional model;
    wherein the prediction model comprises the regional model.

4. The method of claim 1, further comprising:
    receiving, after the initiating the execution of the security service, additional snapshot data; and training, based on the additional snapshot data, an updated prediction model;
    wherein the prediction model comprises the updated prediction model.

5. The method of claim 1, wherein the security service is a scan for cyberattacks on the computing resource.

6. The method of claim 5, wherein a given compute instance among the compute instances comprises a scan engine configured to perform the scan for cyberattacks, and wherein the scan engine is deployed within a cloud computing environment.

7. The method of claim 1, wherein the threshold number is based on a first amount of computing resources associated with the first number of compute instances being substantially similar to a second amount of computing resources associated with the second number of compute instances.

8. A system comprising:
    a memory storing executable instructions; and
    one or more processors that execute the executable instructions to:
    determine, based on a prediction model associated with a computing resource, a prediction of a request load of a security service, wherein the prediction is used to determine a first number of compute instances usable to perform the security service associated with the computing resource;
    deploy, based on the first number of compute instances and prior to receiving a request to initiate the security service, a second number of compute instances, wherein the second number of compute instances is within a threshold number to the first number of compute instances;
    receive the request to perform the security service; and
    initiate, in response to receiving the request to perform the security service, execution of the security service on the second number of compute instances;
    receive, prior to the determining the first number of compute instances, snapshot data; and
    train, based on the snapshot data, the prediction model.

9. The system of claim 8, wherein the one or more processors further execute the executable instructions to:
    determine, based on the request to perform the security service, a third number of compute instances;
    deploy, in response to the receiving the request to perform the security service, the third number of compute instances; and
    initiate, in response to the receiving the request to perform the security service, the security service on the third number of compute instances.

10. The system of claim 8, wherein the one or more processors further execute the executable instructions to:
    determine a particular geographic region associated with the computing instance, wherein the particular geographic region is among a plurality of geographic regions; and
    determine, based on the particular geographic region, a regional model;
    wherein the prediction model comprises the regional model.

11. The system of claim 8, wherein the one or more processors further execute the executable instructions to:
    receive, after the initiating the execution of the security service, additional snapshot data; and
    train, based on the additional snapshot data, an updated prediction model;
    wherein the prediction model comprises the updated prediction model.

12. The system of claim 8, wherein the security service is a scan for cyberattacks on the computing resource.

13. The system of claim 8, wherein a given compute instance among the compute instances comprises a scan engine configured to perform the scan for cyberattacks, and wherein the scan engine is deployed within a cloud computing environment.

14. The system of claim 8, wherein the threshold number is based on a first amount of computing resources associated with the first number of compute instances being substantially similar to a second amount of computing resources associated with the second number of compute instances.

15. One or more non-transitory computer-accessible storage media storing executable instructions that, when executed by one or more processors, cause a computer system to:
- determine, based on a prediction model associated with a computing resource, a prediction of a request load of a security service, wherein the prediction is used to determine a first number of compute instances usable to perform the security service associated with the computing resource;
- deploy, based on the first number of compute instances and prior to receiving a request to initiate the security service, a second number of compute instances, wherein the second number of compute instances is within a threshold number to the first number of compute instances;
- receive the request to perform the security service; and
- initiate, in response to receiving the request to perform the security service, execution of the security service on the second number of compute instances;
- receive, prior to the determining the first number of compute instances, snapshot data; and
- train, based on the snapshot data, the prediction model.

16. The non-transitory computer-accessible storage media of claim 15, wherein the one or more processors further execute the executable instructions to:
- determine, based on the request to perform the security service, a third number of compute instances;
- deploy, in response to the receiving the request to perform the security service, the third number of compute instances; and
- initiate, in response to the receiving the request to perform the security service, the security service on the third number of compute instances.

17. The non-transitory computer-accessible storage media of claim 15, wherein the one or more processors further execute the executable instructions to:
- determine a particular geographic region associated with the computing instance, wherein the particular geographic region is among a plurality of geographic regions; and
- determine, based on the particular geographic region, a regional model;
- wherein the prediction model comprises the regional model.

* * * * *